United States Patent
Wagener et al.

(10) Patent No.: US 12,531,927 B2
(45) Date of Patent: Jan. 20, 2026

(54) COMMUNICATING WITH FIELD DEVICES BASED ON SEMANTICALLY IDENTIFIED VARIABLES

(71) Applicant: ABB Schweiz AG, Baden (CH)

(72) Inventors: Dirk Wagener, Stadthagen (DE); Marcus Heege, Kaisersesch (DE); Christoph Welte, Neu-Ulm (DE)

(73) Assignee: ABB Schweiz AG, Baden (CH)

(*) Notice: Subject to any disclaimer, the term of this patent is extended or adjusted under 35 U.S.C. 154(b) by 107 days.

(21) Appl. No.: 18/446,606

(22) Filed: Aug. 9, 2023

(65) Prior Publication Data

US 2024/0056502 A1 Feb. 15, 2024

(30) Foreign Application Priority Data

Aug. 9, 2022 (EP) ..................................... 22189568

(51) Int. Cl.
*G06F 40/30* (2020.01)
*H04L 67/12* (2022.01)

(52) U.S. Cl.
CPC .................................. *H04L 67/12* (2013.01)

(58) Field of Classification Search
CPC . H04L 67/12; G05B 19/4185; G05B 19/0423; G05B 2219/25428; G06F 16/24564; G06F 40/30
USPC ......................................................... 709/224
See application file for complete search history.

(56) References Cited

U.S. PATENT DOCUMENTS

| | | | |
|---|---|---|---|
| 9,679,032 B2 | 6/2017 | Uenoyama et al. | |
| 2013/0253897 A1* | 9/2013 | Kanbe | G05B 17/02 703/13 |
| 2016/0132048 A1* | 5/2016 | Kambe | G05B 19/418 700/87 |
| 2016/0291563 A1* | 10/2016 | Kumar | H04L 67/303 |
| 2016/0299902 A1* | 10/2016 | Uenoyama | H04L 67/12 |
| 2017/0163481 A1* | 6/2017 | Figueroa | H04L 41/0806 |
| 2017/0235549 A1* | 8/2017 | Rauscher | G06Q 10/10 717/102 |

(Continued)

FOREIGN PATENT DOCUMENTS

| | | |
|---|---|---|
| EP | 3731084 A1 * | 10/2020 |
| EP | 3929673 A1 | 12/2021 |

OTHER PUBLICATIONS

European Patent Office, Extended European Search Report in European Patent Application No. 22189568.3, 9 pp. (Feb. 9, 2023).

*Primary Examiner* — Moustafa M Meky
*Assistant Examiner* — Elizabeth Kassa
(74) *Attorney, Agent, or Firm* — Fitch Even Tabin & Flannery LLP

(57) ABSTRACT

A computer-implemented method includes receiving a command to read a value of a variable from a field device, wherein the field device is designated by a field device identifier and the variable is designated by a semantic identifier; retrieving, from a ruleset, at least one rule indicating a dependency of the sought value of the variable on one or more parameter values of the field device; and generating computer-executable code configured to obtain the parameter values of the field device on which the sought value of the variable depends according to the at least one rule; and compute the sought value of the variable from these parameter values according to the at least one rule.

17 Claims, 3 Drawing Sheets

(56) References Cited

U.S. PATENT DOCUMENTS

| | | | | |
|---|---|---|---|---|
| 2018/0356801 A1* | 12/2018 | Baret | ............... | G05B 19/41845 |
| 2019/0369610 A1* | 12/2019 | Chakravarthy | .... | G05B 23/0235 |
| 2022/0078252 A1* | 3/2022 | Nixon | ................ | G05B 19/4185 |
| 2022/0217217 A1* | 7/2022 | Hottgenroth | ...... | H04L 67/10015 |
| 2023/0080537 A1* | 3/2023 | Ramanathan | ....... | H04L 47/2475 |
| | | | | 709/238 |
| 2024/0273119 A1* | 8/2024 | Wu | .......................... | G06F 7/08 |

* cited by examiner

COMMUNICATING WITH FIELD DEVICES BASED ON SEMANTICALLY IDENTIFIED VARIABLES

CROSS-REFERENCE TO RELATED APPLICATIONS

The instant application claims priority to European Patent Application No. 22189568.3, filed Aug. 9, 2022, which is incorporated herein in its entirety by reference.

FIELD OF THE DISCLOSURE

The present disclosure generally relates to the operation of field devices in industrial plants that are configured to execute an industrial process.

BACKGROUND OF THE INVENTION

Industrial plants for executing industrial processes comprise a plurality of field devices that are connected to a distributed control system, DCS, via a network of the industrial plant. Field devices need to be configured before they can perform their intended function in the industrial plant and may need reconfiguring during operation.

As it is disclosed in EP 3 929 673 A1, parameters of field devices may be labelled with semantic identifiers, such that these parameters can be referenced and accessed by the DCS using these semantic identifiers in a unified manner. That is, even though one and the same parameter may be named and accessed differently on different field devices, it is available on every field device under its semantic identifier.

However, this requires that each semantic identifier translates to at most one parameter on the field device.

BRIEF SUMMARY OF THE INVENTION

The embodiments in accordance with the present disclosure permit access to field device parameters by semantic identifiers even in situations where there is no one-to-one mapping between semantic identifiers and field device parameters. This is achieved by a method to assist retrieving one or more parameter values from a field device, and a method to assist writing one or more parameter values to a field device.

In a first aspect, the invention provides computer-implemented method to assist retrieving one or more parameter values from a field device. The method starts with receiving a command to read a value of a variable from the field device. The field device is designated by a field device identifier, and the variable is designated by a semantic identifier. That is, the command seeks to address a concrete field device and ask for a value of a variable by the semantic identifier by which it is known in the DCS.

Based on the field device and the semantic identifier, at least one rule indicating a dependency of the sought value of the variable on one or more parameter values of the field device is retrieved from a ruleset. That is, multiple field device parameters may be required to determine the sought value of the variable. For example, if the variable is an electric power consumed by the field device, and the field device measures a voltage and a current, the rule may specify that the voltage and the current are needed to determine the power, and that these values need to be multiplied to obtain the power.

The ruleset may be implemented in any suitable manner. For example, it may be defined as programming code implementing a function that may be called using the semantic identifier of the variable as a handle and returns the sought value of the variable as its return value. Such programming code may be in any suitable interpretable or compileable language.

The method then proceeds to, and/or generates computer-executable code that is configured to: obtain the parameter values of the field device on which the sought value of the variable depends according to the at least one rule; and compute the sought value of the variable from these parameter values according to the at least one rule.

BRIEF DESCRIPTION OF THE SEVERAL VIEWS OF THE DRAWING(S)

DETAILED DESCRIPTION OF THE INVENTION

Figure 1:
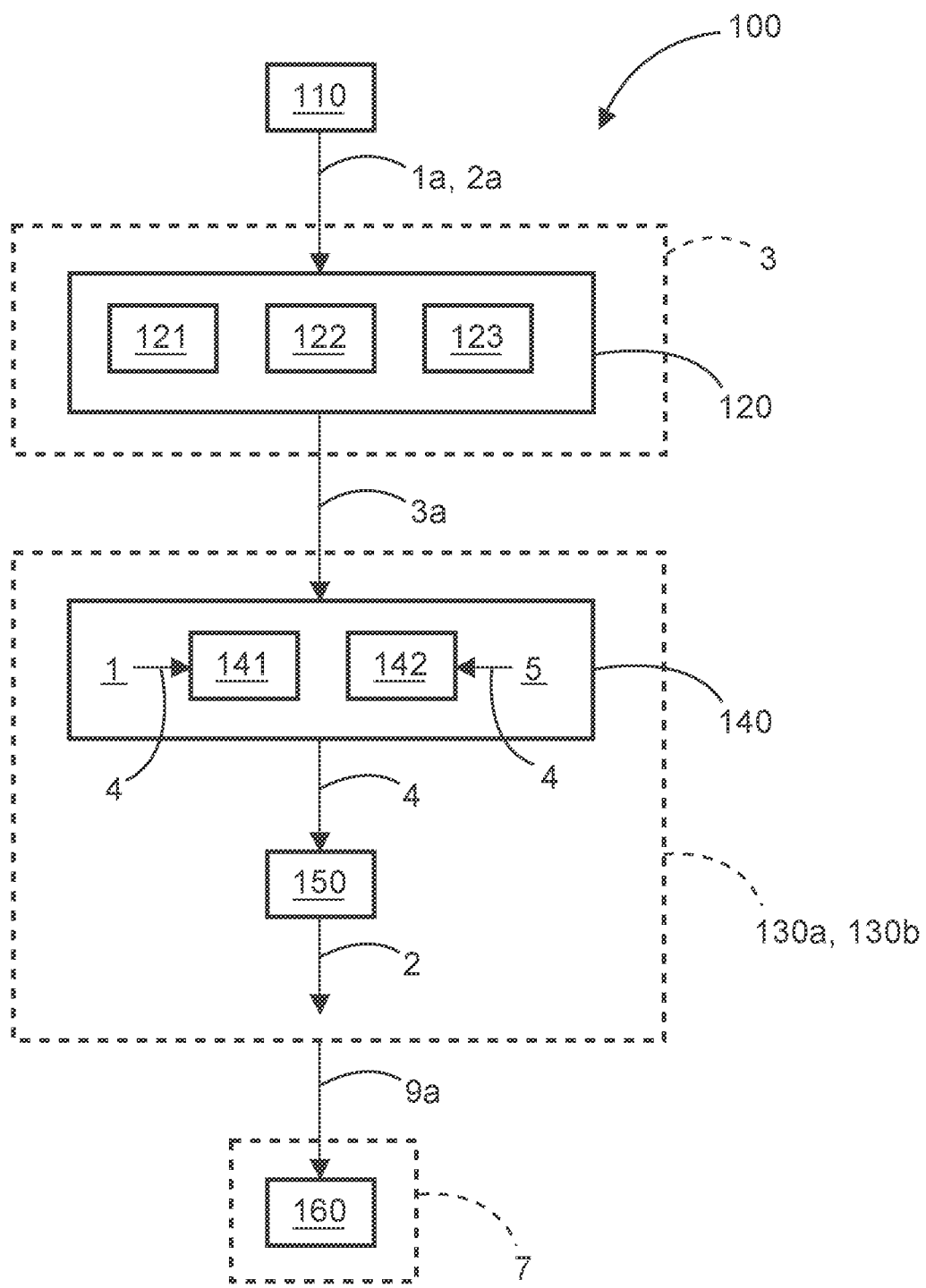
FIG. 1 is a block diagram of a method for assisting retrieving one or more parameter values from a field device, in accordance with the disclosure.
Figure 2:
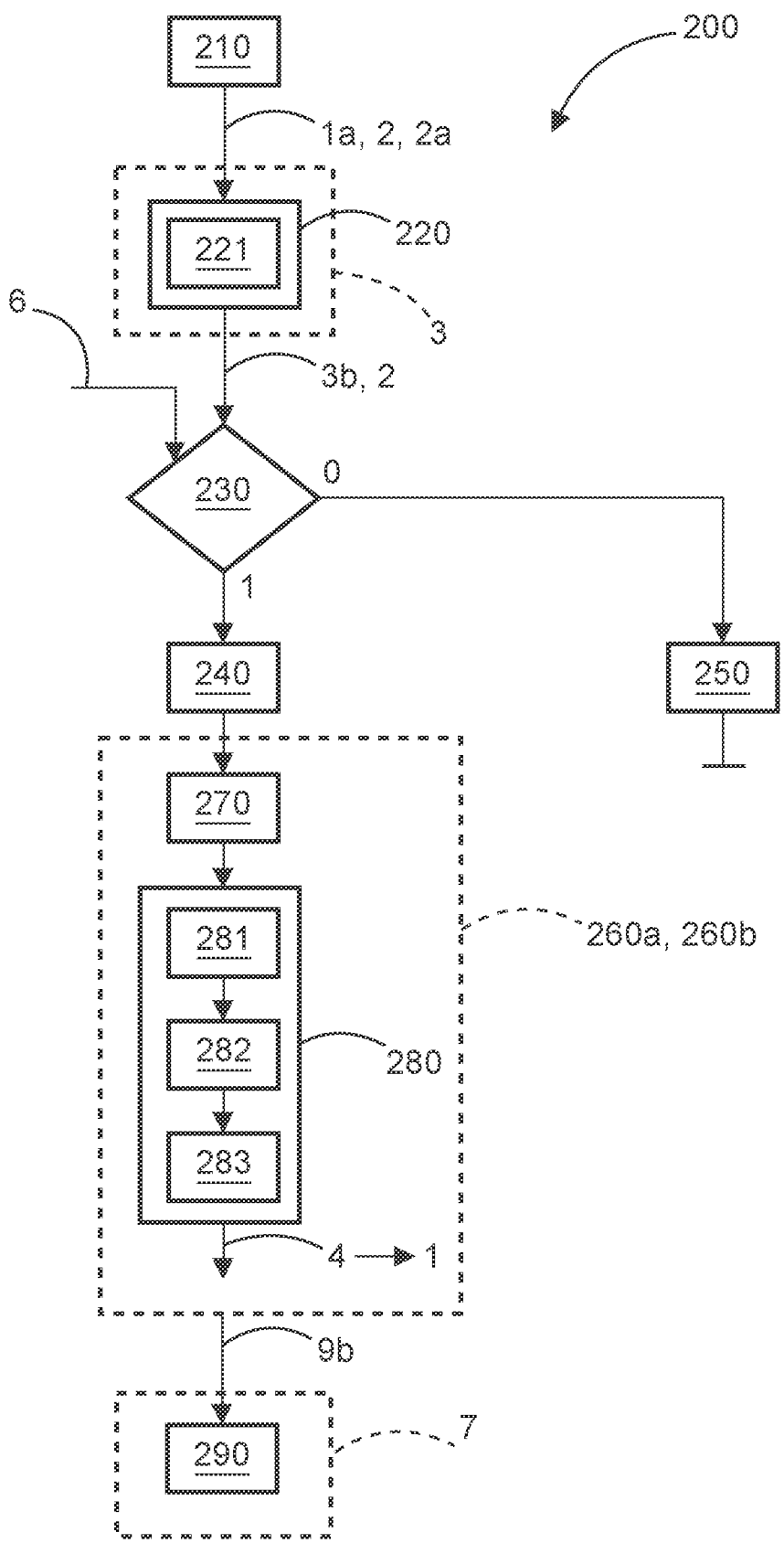
FIG. 2 is a block diagram of a method for assisting writing one or more parameter values to a field device, in accordance with the disclosure.
Figure 3:
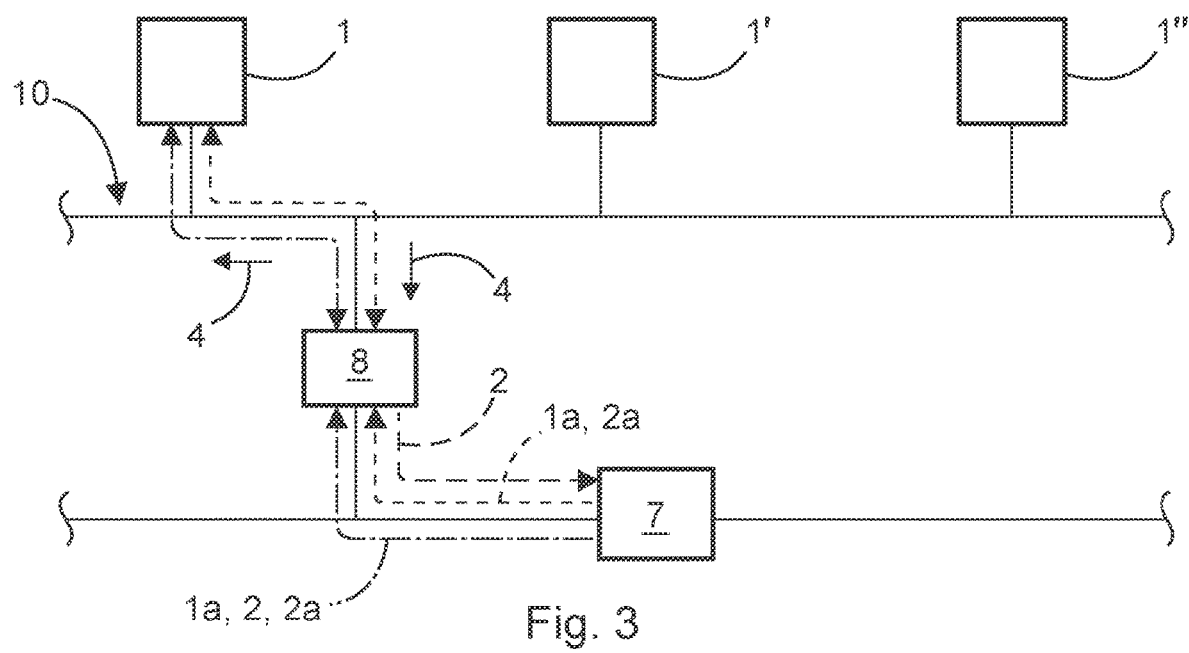
FIG. 3 is a flowchart for the methods shown in FIGS. 1 and 2 along with a broker entity in a network of an industrial plant, in accordance with the disclosure.
Figure 4:
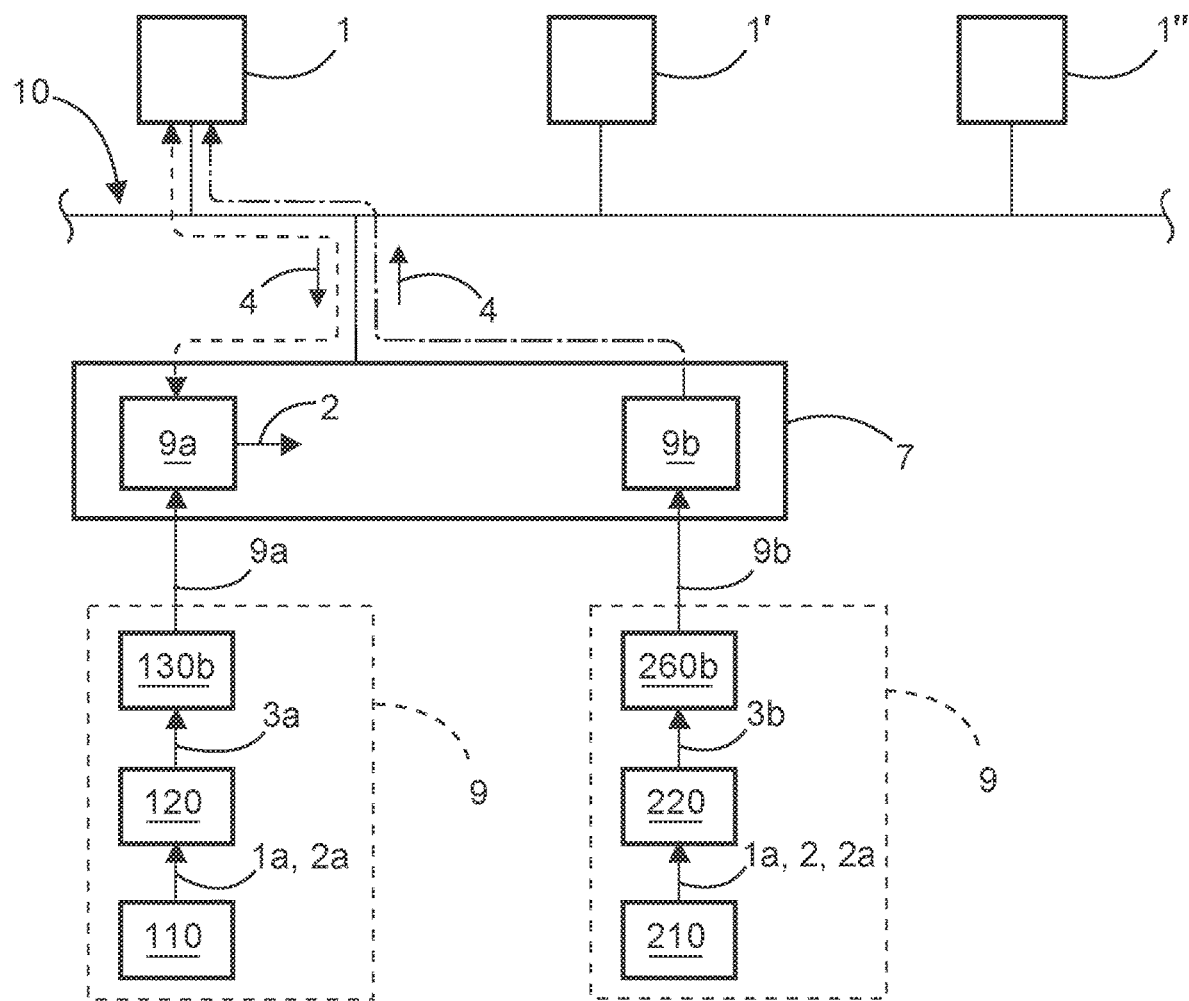
FIG. 4 is a flowchart for the methods shown in FIGS. 1 and 2 along with an engineering tool that generates computer code.

FIG. 1 shows an exemplary embodiment of a method 100 to assist retrieving one or more parameter values 4 from a field device 1; FIG. 2 shows an exemplary embodiment of a method 200 to assist writing one or more parameter values 4 to a field device 1; FIG. 3 shows an exemplary implementation of the methods 100, 200 with a broker entity 8 in a network 10 of an industrial plant; and FIG. 4 shows an exemplary implementation of the methods 100, 200 with an engineering tool 9 that generates computer code 9a, 9b.

FIG. 1 is a schematic flow chart of an embodiment of the method 100 to assist retrieving one or more parameter values 4 from a field device 1. In step 110, a command is received to read a value 2 of a variable from the field device 1. The command comprises a field device identifier 1a that designates the field device 1, as well as a semantic identifier 2a that identifies the variable.

In step 120, based on the field device identifier 1a and the semantic identifier 2a at least one rule 3a indicating a dependency of the sought value 2 of the variable on one or more parameter values 4 of the field device is retrieved from a ruleset 3.

According to block 121, the at least one rule 3a may indicate a computation of at least one sought physical quantity as the sought value 2 of the variable from one or more measurement values captured by the field device 1 as parameter values 4 of the field device 1.

According to block 122, the at least one rule 3a may indicate a mapping and/or conversion between the respective engineering units of parameter values 4 of the field device 1 on the one hand and an engineering unit of the sought value 2 of the variable on the other hand.

According to block 123, the at least one rule 3a may comprise a correspondence between the value 2 of the variable on the one hand and one or more particular bits in at least one parameter value 4 of the field device 1 on the other hand. Such a parameter value 4 may represent a register of the field device 1 that combines many aspects of the status of the field device 1.

In step 140, the parameter values 4 of the field device 1 on which the sought value 2 of the variable depends according to the at least one rule 3a are obtained. According to block 141, the parameter values 4 may be read from the field device 1.

According to block 142, parameter values 4 that have previously been read from the field device 1 and stored in a memory 5 may be retrieved from this memory 5.

In step 150, the sought value 2 of the variable is computed from the obtained parameter values 4 according to the at least one rule 3a.

Steps 140 and 150 can be directly performed according to block 130a. Alternatively or in combination to this, according to block 130b, computer-executable code 9a may be generated that is configured to perform steps 140 and 150. In the latter case, in step 160, this computer-executable code may be executed on a process controller 7 that is communicatively coupled to the field device 1.

FIG. 2 is a schematic flow chart of an exemplary embodiment of the method 200 to assist writing one or more parameter values 4 to a field device 1.

In step 210, a command is received to write a given value 2 of a variable to the field device 1. This command comprises a field device identifier 1a that designates the field device 1, as well as a semantic identifier 2a that designates the variable with the value 2.

In step 220, based on the field device identifier 1a and the semantic identifier 2a, at least one rule 3b indicating how the given value 2 of the variable is to affect one or more parameter values 4 of the field device 1 is retrieved from a ruleset 3.

According to block 221, at least one rule 3b may comprise a correspondence between the value 2 of the variable on the one hand and one or more particular bits in at least one parameter value 4 of the field device 1 on the other hand.

In step 230, it is checked whether the to-be-written value 2 complies with one or more predetermined constraints 6. If this is not the case (truth value 0), in step 250, the writing of the value 2 is prevented. However, if the to-be-written value 2 complies with the constraints (truth value 1), in step 240, the writing of the to-be-written value 2 is caused.

To write the to-be-written value 2, in step 270, based on the given value 2 of the variable and the at least one rule 3b, one or more new parameter values 4 for the field device 1 are computed. In step 280, these new parameter values 4 are then written to the field device 1.

According to block 281, at least one parameter value 4, such as a status register with many bits, may be read from the field device 1. According to block 282, this parameter value 4 may then be updated with at least one computed new parameter value 4, such as one or more to-be-set or to-be-cleared bits. According to block 283, the updated parameter value 4 may then be written back to the field device 1.

Steps 270 and 280 can be directly performed according to block 260a. Alternatively or in combination to this, according to block 260b, computer-executable code 9b may be generated that is configured to perform steps 270 and 280. In the latter case, in step 290, this computer-executable code may be executed on a process controller 7 that is communicatively coupled to the field device 1.

FIG. 3 illustrates an exemplary implementation of the methods 100, 200 with a broker entity 8 in a network 10 of an industrial plant. The industrial plant comprises a network 10 to which multiple field devices 1, 1', 1" and a process controller 7 are connected. A broker entity 7 is also connected to the network 10. Instead of a process controller 7, a configuring device for configuring the field device 1 may be used just as well.

To obtain a value of a variable 2 that is identified by a semantic identifier 2a from a field device 1 that is identified by a field device identifier 1a, the process controller 7 communicates the field device identifier 1a and the semantic identifier 2a to the broker entity 8. The broker entity 8 communicates with the correct field device 1 and obtains one or more parameter values 4, which it then uses to compute the sought value 2 of the variable. This value 2 is then communicated back to the process controller 7.

FIG. 4 illustrates another exemplary implementation of the methods 100, 200. Akin to FIG. 3, the network 10 comprises multiple field devices 1, 1', 1" and a process controller 7.

For implementing the method 100, an engineering tool 9 performs method steps 110, 120 and 130b to generate computer-executable code 9a that reads a value 2 of a variable identified by semantic identifier 2a from a field device 1 identified by field device identifier 1a. When this computer code 9a is executed by the process controller 7, it causes the process controller 7 to communicate with the correct field device 1, read the parameter values 4 from this field device 1, and process them into the sought value 2 of the variable for downstream use by the process controller 7.

For implementing the method 200, an engineering tool 9 performs method steps 210, 220 and 260b to generate computer-executable code 9b that takes in a value 2 of a variable identified by semantic identifier 2a that is to be written to a field device 1 identified by field device identifier 1a. The computer code causes the process controller 7 to process the value 2 into one or more parameter values 4 of the field device 1 and write these one or more parameter values 4 to field device 1.

For example, the method may be performed by a broker entity that is communicatively coupled both to a process controller and to the field device. The process controller may then ask for the sought value of the variable by semantic identifier. The broker entity may translate this request into a request for the needed parameter values of the field device, query the field device for these values, and then compute the sought value of the variable from the obtained parameter values. Such a broker entity may, for example, reside inside the process controller as a software add-on, in a separate device on the network comprising the process controller and the field device, or in a cloud. A broker entity may be responsible for managing access to multiple field devices, but it may also be specific to one single field device. For example, the broker entity may be sold as a hardware or software add-on (such as a wrapper driver) for an existing field device to make it accessible via semantic identifiers of variables defined in a given namespace. Such namespaces may be amended and/or expanded on a much faster timescale than field devices themselves, which may be used for decades at a time. In particular, an industrial plant may comprise a mixture of field devices with manufacturing dates that are scattered across many decades.

In particular, in a use case where field device parameters are mainly actively accessed for reading and/or writing for the purpose of configuring or otherwise managing field devices, and any measurement values routinely collected from the field device are transmitted by the field device on another channel, the broker entity may also be part of, or communicatively coupled with, a Field Information Manager, FIM, tool that is used for configuring, commissioning, diagnosing and maintaining of field devices. Such a configuration tool may provide data of the field devices via an OPC UA server or process the parameters internally in the tool. The configuration tool may avail itself of any suitable source for information about the field device, such as an Electronic Device Description, EDD, or FDI Device Package.

In another example, the method may be implemented in an engineering tool that is configured to produce computer-executable code for operating the industrial plant comprising the field device. For example, during the production of such computer-executable code, the engineering tool may encounter the command to read the sought value of the variable. The engineering tool may then retrieve the at least one rule, and it may then generate computer-executable code that, when executed by a process controller or other suitable device, obtains the needed parameter values of the field device and uses these parameter values to compute the sought values of the variable. That is, the engineer who uses the engineering tool references the sought variable by its semantic identifier in his input to the engineering tool. But the engineering tool may directly resolve an access by semantic identifier to the lower-level operations that work on parameter values of the field device. The finally produced computer-executable code may then contain only these lower-level operations, without making reference to the semantic identifier of the sought variable. When this computer-executable code is executed on a process controller that is communicatively coupled to the field device, it obtains the sought value of the variable even though there is no 1:1 mapping between this variable on the one hand and a parameter value of the field device on the other hand.

The obtaining of the parameter values may comprise reading the parameter values from the field device by any suitable modes and means of communication, such as via an I/O port, by means of Profibus, Fieldbus Foundation, ProfiNet or HART commands, or by means of OPC UA requests. But the parameter values may also be retrieved from a memory in which they have previously been stored after having been read from the field device.

In a particularly advantageous embodiment, the at least one rule indicates a computation of at least one sought physical quantity as the sought value of the variable from one or more measurement values captured by the field device as parameter values of the field device. In this manner, additional knowledge as to which sought physical quantities are derivable from which measurement quantities may be incorporated in the ruleset.

In a further advantageous embodiment, the at least one rule indicates a mapping and/or conversion between the respective engineering units of parameter values of the field device on the one hand and an engineering unit of the sought value of the variable on the other hand. For example, in a case where a variable with a semantic identifier of "pipe pressure" is sought, and multiple field devices along the pipe report the pressure in different measurement units (e.g., bar, psi, Torr and mmHg), the rule may be used to unify the responses of all these field devices to a query for "pipe pressure" to one single unit, such as bar.

The ruleset may also, for example, be used to unify the terminology in which different field device report measurement values or a status. For example, when a valve can be either open or closed, it is up to the manufacturer of the field device which state is to be designated with a logical 0 and which state is to be designated with a logical 1. The variable with the semantic identifier "valve state" may then be configured to have exactly one of the values "open" or "closed", such that any doubt as to their interpretation is ruled out.

In particular, at least one engineering unit may be stored as a reference to a predetermined table of engineering units. In this manner, there can be no engineering units other than those in the predetermined table, which is more reliable than parsing engineering units stored as text.

In a second aspect, the invention provides a method to assist writing one or more parameter values to a field device. This method starts with receiving a command to write a given value of a variable to the field device. Again, the field device is designated by a field device identifier and the variable is designated by a semantic identifier. That is, the command seeks to address a concrete field device and access a variable for writing by the semantic identifier by which it is known in the DCS.

Based on the field device identifier and the semantic identifier, at least one rule indicating how the given value of the variable is to affect one or more parameter values of the field device is retrieved from a ruleset. That is, multiple parameter values may have to be changed in order to write the variable. For example, if a value is given with a very high numeric precision that does not fit within one single space allotted for a parameter value on the field device, it may become necessary to write a first part of the variable into a first parameter on the field device, then write a second part of the variable into a second field parameter on the field device, and finally write an indication to commit the changing of the set point value into a third parameter on the field device.

In an analogous manner to the case of retrieving parameter values from the field device, the ruleset may, for example, be implemented in the form of programming code. For example, a procedure or method call may be implemented that is called by the semantic identifier of the variable as a handle and accepts the to-be-set value of the variable as an argument.

The method then proceeds to, and/or generates computer-executable code that is configured to: compute, based on the given value of the variable and the at least one rule, one or more new parameter values for the field device; and write these new parameter values to the field device.

Akin to the first method, this method may be executed by a broker entity that is communicatively coupled both to a process controller and to the field device, or by an engineering tool that converts all accesses to the semantic identifier into low-level accesses to the parameter values on the field device. The final computer-executable code may then be devoid of any references to the semantic identifier.

As discussed before, a variable that is designated by a semantic identifier may correspond to only part of a parameter of the field device. For example, the variable may correspond to one single bit of a status register that is stored in a parameter of the field device. It may then not be possible to compute the new value of this parameter that is to be written to the field device based on the given value of the variable and the at least one rule alone. Therefore, in a particularly advantageous embodiment, at least one parameter value is first read from the field device and then updated with at least one computed new parameter value. For example, bits in the parameter value that has been read from the field device may be set or cleared according to the computed new parameter value. The updated parameter value is then written back to the field device.

In a further particularly advantageous embodiment, the given value is configured to cause entry of the field device into a simulation mode. In the simulation mode, the field device may output a known example output for testing. This is frequently used when troubleshooting field devices in an industrial plant. But every field device may have a different protocol (e.g., by writing sequences of certain values to certain parameters of the field device) to activate this simulation mode. If simulation mode can be accessed on every field device just by writing 1 or "Enabled" to the semantic variable "simulation mode" of the respective field device, troubleshooting is made much easier.

In a particularly advantageous embodiment, it may be checked whether the to-be-written value complies with one or more predetermined constraints. For example, there may be a constraint that the value is at or above a lower bound, and/or at or below an upper bound. Also, there may be a constraint regarding other state variables of the industrial plant. For example, before a sensitive mass spectrometer in a vacuum vessel is turned on, a constraint may have to be met as to the pressure in the vacuum vessel. If the vacuum is not good enough, the mass spectrometer must not be turned on because it may be damaged.

Therefore, in response to determining that the to-be-written value complies with the one or more constraints, the writing of this value may be caused. By contrast, in response to determining that the to-be-written value does not comply with the one or more constraints, the writing of this value may be prevented.

In particular, regarding both the retrieving and the writing of parameter values, the semantic identifier may be defined by the Process Automation Device Information Model, PA-DIM, or another given namespace. PA-DIM defines a standardized namespace of semantic identifiers that is common to a wide variety of field devices spanning multiple device classes. That is, only a subset of the variables which have semantic identifiers defined in PA-DIM can be made accessible on any given field device. For example, only a field device that makes measurements from which a pressure or a temperature is somehow derivable may produce meaningful values for a pressure or temperature variable. Also, while PA-DIM may define a lot of different set-points that may be set on field devices, any given field device may offer only one or a few of them.

Thus, when converting a read or write access to a variable that is identified by a semantic identifier to low-level accesses to concrete parameters of a field device, it may be checked as a constraint whether a rule is defined how to map an access to this variable to low-level accesses to parameters of the field device. If the ruleset contains no such rule (e.g., if an attempt is made to set a pressure set point on a field device that only offers to set a temperature set point), the mapping from the read or write access to the variable to low-level accesses to concrete field device parameters may be left missing. I.e., the read or write access may be ignored. However, such an invalid read or write access may also be taken as a signal that something is amiss and needs fixing. Therefore, an error may be detected and propagated. For example, an exception may be thrown. In particular, if the methods described here are implemented in an engineering tool, such errors may be detected already at the time of creating the computer-executable code that will later be used to run the industrial plant. Errors and exceptions that occur at this time are much easier to handle than errors and exceptions that occur at run-time in the industrial plant.

In a further particularly advantageous embodiment, regarding both the retrieving and the writing of parameter values, the at least one rule comprises a correspondence between the value of the variable on the one hand and one or more particular bits in at least one parameter value of the field device on the other hand. In many field devices, multiple indicators of the device status, and in particular multiple binary indicators, are combined in one or more registers that form parameters of the field device. For example, a parameter with a numeric range from 0 to 255 may encode 8 bits that may be assigned to different aspects of the device status. If there are many aspects to cover, more than one parameter of the field device may be necessary to encode them all. It is up to the manufacturer of the field device to decide which aspects to encode in which of the parameters of the field device. For example, status aspects A to H may be encoded in a first parameter of the field device, and status aspects I to P may be encoded in a second parameter of the field device. If a variable that is accessed by the semantic identifier "health status" needs access to aspects A, F and M, access to both the first and the second parameter of the field device is necessary to evaluate the sought value of the variable "health status". The evaluation is then not possible when the semantic meaning "health status" needs to be mapped to exactly one parameter of the field device according to a previous method. With the methods now proposed here, for the access to variables identified by semantic identifiers, it makes no more difference whether all the needed information is in one parameter of the field device or distributed over multiple such parameters.

The same also applies to the writing of variables. The setting of one single status variable identified by a semantic identifier may comprise multiple actions that need to be triggered by setting respective bits in registers, and these registers may reside in different parameters on the field device.

Even if there is only one parameter of the field device to be evaluated, the conversion between certain bits in the parameter on the one hand and the sought value of the variable on the one hand can be quite complex. For example, in applications where field devices are connected via low bandwidth links, the encoding of numeric values into bits in the parameter of the field device may be optimized for maximum compression of the data, rather than for the ease of decoding. For example, a temperature value may be encoded as a positive or negative value relative to a given offset, in a manner that a maximum resolution of the measurement value is put into the available bits. With the present method, the complexity of the decoding (or of the encoding when writing variable values) may be hidden in the ruleset entirely.

Because they are computer-implemented, the present methods may be embodied in the form of a software. The invention therefore also relates to a computer program with machine-readable instructions that, when executed by one or more computers and/or compute instances, cause the one or more computers and/or compute instances to perform a method described above. Examples for compute instances include virtual machines, containers or serverless execution environments in a cloud. The invention also relates to a machine-readable data carrier and/or a download product with the computer program. A download product is a digital product with the computer program that may, e.g., be sold in an online shop for immediate fulfilment and download to one or more computers. The invention also relates to one or more compute instances with the computer program, and/or with the machine-readable data carrier and/or download product.

LIST OF REFERENCE SIGNS 1, 1', 1" field devices
2 value of variable identified by semantic identifier 2a 2a semantic identifier
3 ruleset
3a rules for reading variable value 2
3b rules for writing variable value 2
4 parameter values of field device 1
5 memory
6 constraints
7 process controller
8 broker entity
9 engineering tool
9a computer-executable code for reading variable value 2
9b computer-executable code for writing variable value 2
10 network in industrial plant
100 method to assist retrieving parameter values 4 from field device 1
110 receiving command to read variable value 2
120 retrieving rule 3a from ruleset 3
121 including rule 3a comprising computation
122 including rule 3a comprising unit mapping/conversion
123 including rule 3a comprising correspondence to parameter bits
130a proceeding with steps 140 and 150
130b generating computer-executable code 9a
140 obtaining parameter values 4
141 reading parameter values 4 from field device 1
142 retrieving parameter values 4 from memory 5
150 computing sought variable value 2
160 executing computer-executable code 9a
200 method to assist writing parameters 4 to field device 1
210 receiving command to write variable value 2
220 retrieving rule 3b from ruleset 3
221 including rule 3b comprising correspondence to parameter bits
230 checking whether variable value 2 meets constraints 6
240 causing writing of variable value 2
250 preventing writing of variable value 2
260a proceeding with steps 270 and 280
260b generating computer-executable code 9b
270 computing new parameter values 4
280 writing new parameter values 4 to field device 1
281 reading parameter 4 from field device 1
282 updating parameter value 4 with computed new parameter value 4
283 writing updated parameter value 4 back to field device 1
290 executing computer-executable code 9b All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method to assist retrieving one or more parameter values from a field device, comprising:
    receiving a command to read a value of a variable from the field device, wherein the field device is designated by a field device identifier and the variable is designated by a semantic identifier;
    retrieving, based on the field device identifier and the semantic identifier, from a ruleset, at least one rule indicating a dependency of the sought value of the variable on one or more parameter values of the field device, wherein the sought value of the variable depends on at least two parameter values of the one or more parameter values of the field device;
    proceeding to, and/or generating computer-executable code configured to:
        obtain the one or more parameter values of the field device on which the sought value of the variable depends according to the at least one rule; and
        compute the sought value of the variable from these one or more parameter values according to the at least one rule,
    checking whether a given, to-be-written value complies with one or more predetermined constraints; and
    in response to determining that the to-be-written value complies with the one or more constraints, causing the writing of the to-be-written value, or
    in response to determining that the to-be-written value does not comply with the one or more constraints, not causing the writing of the to-be-written value.

2. The method of claim 1, wherein the obtaining of the one or more parameter values comprises:
    reading the one or more parameter values from the field device; and/or retrieving parameter values that have previously been read from the field device and stored in a memory from this memory.

3. The method of claim 1, wherein the at least one rule indicates a computation of at least one sought physical quantity as the sought value of the variable from one or more measurement values captured by the field device as parameter values of the field device.

4. The method of claim 1, wherein the at least one rule indicates a mapping and/or conversion between the respective engineering units of parameter values of the field device, and an engineering unit of the sought value of the variable.

5. The method of claim 4, wherein at least one engineering unit is stored as a reference to a predetermined table of engineering units.

6. The method of claim 1, wherein the semantic identifier is defined by a Process Automation Device Information Model, PA-DIM, or another given namespace.

7. The method of claim 1, wherein the at least one rule comprises a correspondence between the value of the variable, and one or more particular bits in at least one parameter value of the field device.

8. The method of claim 1, wherein receiving the command, retrieving the at least one rule, and generating computer-executable code are performed by an engineering tool, and wherein the method further comprises: executing the computer-executable code on a process controller that is communicatively coupled to the field device.

9. The method of claim 1, wherein the method is performed by a broker entity that is communicatively coupled to a process controller and to the field device.

10. A computer-implemented method to assist writing one or more parameter values to a field device, comprising:
   receiving a command to write a given value of a variable to the field device, wherein the field device is designated by a field device identifier and the variable is designated by a semantic identifier;
   retrieving, based on the field device identifier and the semantic identifier, from a ruleset, at least one rule indicating how the given value of the variable is to affect one or more parameter values of the field device, wherein at least two parameter values of the one or more parameter values need to be changed to write the value of the variable;
   proceeding to, and/or generating, computer-executable code configured to:
      compute, based on the given value of the variable and the at least one rule, one or more new parameter values for the field device; and
      write these new parameter values to the field device,
   checking whether a given, to-be-written value complies with one or more predetermined constraints; and
   in response to determining that the to-be-written value complies with the one or more constraints, causing the writing of the to-be-written value, or
   in response to determining that the to-be-written value does not comply with the one or more constraints, not causing the writing of the to-be-written value.

11. The method of claim 10, wherein the writing of the new parameter values to the field device comprises:
   reading at least one parameter value from the field device;
   updating the at least one parameter value with at least one computed new parameter value; and
   writing the at least one computed parameter value back to the field device.

12. The method of claim 10, wherein the given value is configured to cause entry of the field device into a simulation mode.

13. The method of claim 10, wherein the semantic identifier is defined by a Process Automation Device Information Model, PA-DIM, or another given namespace.

14. The method of claim 10, wherein the at least one rule comprises a correspondence between the value of the variable, and one or more particular bits in at least one parameter value of the field device.

15. The method of claim 10, wherein receiving the command, retrieving the at least one rule, and generating computer-executable code are performed by an engineering tool, and wherein the method further comprises: executing the computer-executable code on a process controller that is communicatively coupled to the field device.

16. The method of claim 10, wherein the method is performed by a broker entity that is communicatively coupled to a process controller and to the field device.

17. A computer-implemented method to assist writing one or more parameter values to a field device, comprising:
   receiving a command to write a given value of a variable to the field device, wherein the field device is designated by a field device identifier and the variable is designated by a semantic identifier;
   retrieving, based on the field device identifier and the semantic identifier, from a ruleset, at least one rule indicating how the given value of the variable is to affect one or more parameter values of the field device;
   proceeding to, and/or generating, computer-executable code configured to:
      compute, based on the given value of the variable and the at least one rule, one or more new parameter values for the field device; and
      write these new parameter values to the field device;
   checking whether a to-be-written value complies with one or more predetermined constraints; and
   in response to determining that the to-be-written value complies with the one or more constraints, causing the writing of the to-be-written value, or
   in response to determining that the to-be-written value does not comply with the one or more constraints, not causing the writing of the to-be-written value.

* * * * *